United States Patent
Gisselman et al.

(10) Patent No.: US 11,883,944 B2
(45) Date of Patent: Jan. 30, 2024

(54) ACTUATOR ARRANGEMENT FOR A POWER TOOL

(71) Applicant: ATLAS COPCO INDUSTRIAL TECHNIQUE AB, Stockholm (SE)

(72) Inventors: Hans Niklas Gisselman, Vasa (SE); Fredrik Karl Emil Zachrisson, Nacka (SE); Guillermo Emiliano Bossi Silva, Nacka (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 579 days.

(21) Appl. No.: 17/252,206

(22) PCT Filed: May 24, 2019

(86) PCT No.: PCT/EP2019/063433
§ 371 (c)(1),
(2) Date: Dec. 14, 2020

(87) PCT Pub. No.: WO2019/238388
PCT Pub. Date: Dec. 19, 2019

(65) Prior Publication Data
US 2021/0252689 A1 Aug. 19, 2021

(30) Foreign Application Priority Data
Jun. 15, 2018 (SE) .................... 1830195-2

(51) Int. Cl.
*B25F 5/02* (2006.01)
*G01D 5/14* (2006.01)
(Continued)

(52) U.S. Cl.
CPC ............... *B25F 5/02* (2013.01); *G01D 5/145* (2013.01); *G01D 18/00* (2013.01); *B25F 5/001* (2013.01)

(58) Field of Classification Search
CPC ............... B25F 5/00; B25F 5/001; B25F 5/02
See application file for complete search history.

(56) References Cited

U.S. PATENT DOCUMENTS

| | | | |
|---|---|---|---|
| 5,553,675 A | 9/1996 | Pitzen et al. | |
| 5,747,953 A * | 5/1998 | Philipp | H02P 25/032 |
| | | | 388/907 |

(Continued)

FOREIGN PATENT DOCUMENTS

| | | |
|---|---|---|
| EP | 3155996 A1 | 4/2017 |
| JP | 3018959 U | 12/1995 |

(Continued)

OTHER PUBLICATIONS

International Preliminary Report on Patentability (IPRP) dated Apr. 22, 2020 issued in International Application No. PCT/EP2019/063433.

(Continued)

*Primary Examiner* — Joshua G Kotis
(74) *Attorney, Agent, or Firm* — Holtz, Holtz & Volek PC

(57) ABSTRACT

A handheld power tool includes an actuator arrangement, which includes a movable trigger member and a sensor arrangement. The trigger member includes at least one magnetic element, and the sensor arrangement is responsive to a displacement of the magnetic element along with the movable trigger member relative to the sensor arrangement. The sensor arrangement includes an analog magnetic field sensor configured to provide a signal proportional to the position of the magnet, a first digital magnetic field sensor configured to provide a first digital switching point in response to the position of the magnet, and a second digital magnetic field sensor configured to provide a second digital switching point in response to the position of the magnet.

15 Claims, 2 Drawing Sheets

(51) Int. Cl.
*G01D 18/00* (2006.01)
*B25F 5/00* (2006.01)

(56) References Cited

U.S. PATENT DOCUMENTS

| | | | |
|---|---|---|---|
| 6,025,683 | A | 2/2000 | Philipp |
| 6,674,280 | B1 | 1/2004 | Goetz et al. |
| 10,673,433 | B2 * | 6/2020 | Kobayashi ............. H03K 17/78 |
| 11,400,570 | B2 * | 8/2022 | Thorson ................ B25B 23/141 |
| 2007/0085496 | A1 | 4/2007 | Philipp et al. |
| 2010/0061181 | A1 | 3/2010 | Malackowski et al. |
| 2014/0008090 | A1 * | 1/2014 | Kokinelis ................ B25F 5/02 29/428 |
| 2014/0232316 | A1 | 8/2014 | Philipp |
| 2015/0097641 | A1 | 4/2015 | Chen |
| 2017/0109488 | A1 | 4/2017 | Still et al. |
| 2017/0128082 | A1 | 5/2017 | Philipp |
| 2017/0191851 | A1 * | 7/2017 | Hill ........................ G01D 5/145 |
| 2018/0310945 | A1 | 11/2018 | Philipp |
| 2020/0235638 | A1 * | 7/2020 | Velderman ............. H01R 12/52 |

FOREIGN PATENT DOCUMENTS

| | | |
|---|---|---|
| JP | 2006120466 A | 5/2006 |
| WO | 0150091 A1 | 7/2001 |

OTHER PUBLICATIONS

International Search Report (ISR) dated Sep. 23, 2019 issued in International Application No. PCT/EP2019/063433.
3 Written Opinion dated Sep. 23, 2019 issued in International Application No. PCT/EP2019/063433.
Japanese Office Action dated May 29, 2023 (and English translation thereof) issued in counterpart Japanese Application No. 2020-569985.

* cited by examiner

ACTUATOR ARRANGEMENT FOR A POWER TOOL

TECHNICAL FIELD

The present invention generally relates to power tools, more particularly to a power tool having an actuator arrangement comprising a movable trigger member and a sensor arrangement and a method for calibrating such an arrangement.

TECHNICAL BACKGROUND

Power tools, for example hand held power tools commonly include an actuating mechanism by means of which the operator may turn the tool on or off, i.e. to activate and deactivate the tool. Examples of such mechanism include on/off buttons and actuating mechanism including triggers which may be depressed by a user in order to for example start the power tool. Also known are triggers providing more precise control of the tool than a simple on/off functionality. One example is trigger mechanisms comprising sliding contact, wherein a contact moves in tandem with the retraction of a trigger member thus providing control possibilities over the course of movement of the trigger. Such devices however tend to be more complex and hence more expensive than traditional triggers. More importantly, one major problem of sliding contacts is that such contacts are subjected to intense wear and therefore tend to have a shorter life time than desired.

In order to alleviate some of these drawbacks, i.e. in order to obtain a more precise control of the power tool behavior by means of the trigger member but without the drawback of a shorter life time, contactless sensors have been proposed. One example of such sensors are so called magnetic field sensors. When utilizing such sensors, the magnetic field of a magnetic element arranged in a movable trigger may be sensed by the magnetic field sensor. These sensors are however associated with various drawbacks, for example scatter in behavior between sensors potentially lowering the accuracy of the trigger arrangement as such and sensitivity of the sensors to external interfering fields. Hence, there exists a need for improvement in the field of power tools having such sensors arrangement.

SUMMARY OF THE INVENTION

Accordingly, it would be desirable to provide a power tool comprising an improved actuator arrangement. In particular, it would be desirable to provide a power tool comprising an actuator arrangement comprising magnet field sensors providing improved control and functionality to the power tool. To better address one or more of these concerns a power tool comprising an actuator arrangement and a corresponding method as defined in the independent claims are provided. Preferred embodiments are defined in the dependent claims.

According to a first aspect of the invention a power tool comprising an actuator arrangement is provided, wherein the actuator arrangement comprises a movable trigger member and a sensor arrangement, wherein the trigger member comprises at least one magnetic element, wherein the sensor arrangement is responsive to a displacement of the magnetic element along with the movable trigger member relative to the sensor arrangement, and wherein the sensor arrangement comprises a analog magnetic field sensor, a first digital magnetic field sensor and a second digital magnetic field sensor.

According to the first aspect, the power tool provides an inventive solution to the concerns described above by means of a design incorporating a number of magnetic field sensors and a magnetic element comprised by, or arranged at, the movable trigger member. More particularly, by means of the inventive combination of an analog magnetic field sensor (sometimes also referred to as a linear magnetic field sensor) providing a signal proportional to the magnetic field strength and two digital sensors each providing a defined and discrete switching point the level of control and accuracy of the actuator arrangement and hence the power tool may be significantly improved. The analog sensor provides a signal proportional to the magnetic field generated by the magnetic element (which may be or comprise for example a permanent magnet) which field varies as the magnetic element is displaced along with the movable trigger member with respect to the sensor arrangement, hence providing a precise control by means of the trigger member. The digital sensors on the other hand provide improved control and accuracy to the arrangement, thereby greatly reducing known problems relating to for example scatter in the response between analog sensors. This for example by means of providing a defined switching points by means of which the analog sensor may be in a sense calibrated, or at least by means of which a starting point of the linear sensor may be determined by means of using the determined switching point of one or both of the digital sensor(s) as a fixed reference. Hereby, the advantages of using a contactless analog magnetic field sensor may be utilized while known problems related to for example scatter between sensors may be avoided or at least mitigated. Hence, the quality of the work performed as well as the handling of the tool may be significantly facilitated compared to what is known in the art as the tool actuator arrangement provides precise control to a user controlling the working process by means of trigger depression.

The trigger member, may hence in some embodiments be described as moveable between a first and a second position, wherein the movement of the trigger member and the magnetic element between the first and second position may be sensed by the sensor arrangement. In other words, each of the analog magnetic field sensor, the first digital magnetic field sensor and the second digital magnetic field sensor may be adapted to sense a displacement of the magnetic element relative to the sensor arrangement, i.e. each of the sensors may be responsive to a change in the magnetic field generated by the magnetic element due to the displacement of the magnetic element along with the movable trigger member. Further, the analog sensor element may be adapted to generate an output signal proportional to the magnetic field. For the sake of completeness, the terms analog magnetic field sensor and linear magnetic field sensor are used interchangeably throughout the present specification and refer to a sensor providing an output signal (i.e. an output voltage) proportional to the magnetic field generated by the magnetic element. The digital sensor elements on the other hand may further be adapted to generate an output signal or response in the form of a digital sensor response (i.e. a switch) indicating that a certain predefined level of the magnetic field strength has been reached. For the sake of completeness, while the magnetic element is in the present specification described as arranged in and movable with the trigger member further embodiments are probably conceivable wherein the sensor arrangement instead is arranged in the movable trigger member, and the magnetic element is fixed. This is however probably less plausible or advantageous at least for practical reasons.

The type of sensors described in the foregoing may sense any magnetic field present, including any external fields present, and this may pose a safety hazard in that the tool may potentially be started by such an external field. The design of the present invention incorporating two digital magnetic field sensor is however also advantageous in that the two sensors may be used to detect the presence of such an external field, thus improving safety of the tool. For example, in some embodiments, the digital sensors may be physically arranged such that during normal operation of the trigger member, as the field generated by the magnetic element passes along the sensor elements during trigger member depression, one of the digital sensors should indicated a rising field (by means of a switch) and the other should indicate a drop or decrease (by means of a switch). Hereby, normal operation may be presumed and the tool may be activated. Should however an external field be present, both sensor indicate a rising field, and a warning or lock of the tool may be initiated preventing any activation of the tool. One additional advantage of the design of the present invention is that in addition to the functionality described in the foregoing for identifying potentially hazardous external fields, the analog sensor of the present invention may additionally provide information related to the actual strength of the sensed field, whereas the digital sensors may only provide a switching point indicating that a certain level has been reached. Initial protection for preventing unintentional activation of the tool may therefore be provided by means of a use of predefined boundaries within which the field strength should lie in order for activation to be allowed.

In some embodiments, the functionality described in the foregoing may be performed by means of a control unit or similar. In other embodiments, the sensor arrangement may be adapted to provide a functionality to stop/switch of the tool should such software not perform the functionality within a certain predefined time period. Accordingly, in some embodiments, the power tool further comprises circuitry and/or a control unit configured to control the power tool according to what has been described above. More particularly, in some embodiments, such a control unit may be operative to control the power tool in response to movement of the trigger member, based on output from at least one of the sensors comprised by the sensor arrangement. Embodiments are conceivable wherein an external power tool controller is configured to control the power tool according to the foregoing.

In use, when an operator depresses the trigger to for example activate the tool, the movable trigger member and hence the magnetic element moves along the sensor arrangement such that the magnetic field generated by the magnetic element may be sensed by the different sensors of the arrangement. The sensors in response provide an output, where the digital magnetic field sensors each provide a digital switching point while the analog sensor on the other hand provides a response proportional to the magnetic field and hence proportional to the position of the trigger member, i.e. the degree of depression. The output of the tool may thus be controlled by the user, by moving the trigger member from a first, or initial starting point to a second, or final, position. When the operator wishes to stop/deactivate the tool, the trigger may be released. With regards to the behavior of the tool controlled by means of the linear sensor as the trigger is depressed between the first and second position, various strategies may be employed where examples include a linear behavior, a progressive behavior, and various types of ramping or similar. Further, for example when drilling into multiple layer materials, two-step (or multi-step) control may be utilized. In some embodiments, the control by means of the linear magnetic field sensor may be limited to only an initial phase of operation providing for example operator-control slow start. Further, additional functionality is also conceivable within the scope defined. For example, in some embodiments, the power tool may comprise a light such as a led-light adapted to for example light up a work piece. The strength/intensity of such a light may be varied by means of the actuator arrangement. In some embodiments, the power tool may also comprise a user interface such as for example a graphical user interface (GUI) where the trigger member of the arrangement may be used to navigate the menus in a convenient manner. For example, a larger depression of the trigger may result in faster scrolling through menus, lists or the like provided in the GUI.

According to one embodiment, the tool is a handheld tool. The power tool may in some embodiment be an electrically powered tool, in an exemplary embodiment the tool may be a battery powered tool. In one advantageous embodiment, the power tool is a drill such as for example a battery powered drill. For such a tool, the provision of an improved so called "slow start" provides for example improved possibilities to control the initial phase of the drilling. The skilled person however realizes that any other type of power tools is conceivable within the scope of the present invention. Further, the skilled person also realizes that the present invention may also be realized as a free standing (i.e. separate) actuator arrangement for use with a power tool, i.e. an actuator arrangement adapted to be attached to, or arranged on or in a power tool.

According to one embodiment, the sensor arrangement is arranged such that the sensors comprised by the arrangement are arranged successively (i.e. after one another) at least in a first direction. For example, within this scope, the sensors may be arranged at successive positions along an axis extending in a first direction. The positions of the sensors may further be either successive or equal along a second axis extending in a second direction, perpendicular to the first direction. Hereby, the sensors may for example be arranged on different sides of the axis extending in the first direction. In some embodiments, the first and second digital sensors only may be arranged successively. The order of the sensors along each axis is in any case optional.

According to one embodiment, the sensors comprised by the sensor arrangement are linearly arranged. For example, the sensors may be linearly arranged along an axis or imaginary line extending in the first direction mentioned above. Such an arrangement is advantageous in that the magnetic field generated by the magnetic element as sensed by each of the sensors may be stronger. According to one embodiment, the analog sensor is arranged between the first and the second digital magnetic field sensor. For example, the sensors may be linearly arranged along the axis mentioned above such that the first analog sensor is arranged between the first and the second digital sensor along the axis. This is advantageous for example in that the accuracy of the sensors may benefit further. According to one embodiment, the first direction coincides with the direction of movement of the movable trigger element, i.e. the trigger element moves along or at least in parallel to the imaginary line as the trigger is depressed.

The distance between the sensors is largely determined based on ergonomic considerations, i.e. based on the desired stroke length. This in turn gives the arrangement of the sensors based on the magnetic field, type of sensor and polarity of the magnetic element. For example, in one embodiment, the sensors may be linearly arranged along an axis and the analog sensor may be arranged between the first and the second digital magnetic field sensor such that distance between the first digital sensor and the analog sensor is smaller than the distance between the second digital sensor and the analog sensor. For example, in one embodiment the distance between the first digital sensor and the analog sensor lies in the approximate interval 1-5 mm, preferably 1-3 mm, whereas the distance between the second digital sensor and the analog sensor lies in the approximate interval 5-12 mm, preferably 7-10 mm. All distances refer to the distance between adjacent edges and measured along the axis along which the sensors are linearly arranged.

According to one embodiment, the movable trigger member comprises a protruding element, and the magnetic element is arranged in the protruding element. Further, in some embodiments the protruding element is adapted to move along the imaginary line mentioned above as the trigger is depressed. According to one embodiment, the protruding element comprises a recess, and the magnetic element is fitted in the recess. This is a particular advantage of the protruding element as such, in that the mounting of the magnetic element is facilitated and also in that the position of the sensor is clearly defined thus reducing variation between tools. In some embodiments, the magnetic element may be press fitted in the recess. In other embodiments, the magnetic element may be glued to the recess. According to one embodiment, the magnetic element is arranged at a first end of the protruding element.

According to one embodiment, the sensor arrangement is arranged on a surface of a circuit board, wherein the protruding element comprises a supporting ridge extending along the protruding element and adapted to slidingly bear against the surface of the circuit board, and wherein the circuit board comprises a supporting portion along which the protruding element may slidingly bear. This is particularly advantageous in that it allows for a design wherein the movable parts, i.e. the trigger member and hence the protruding element comprised by it may be positioned as close as possible to the magnetic field sensor, since the mechanical guidance provided by the supporting ridge prevents the protruding element from damaging or even loosening the sensors. In some embodiments the supporting portion extends at least in parallel to the first direction. Further, in some embodiment, the supporting portion of the circuit board is a portion held free from components.

According to one embodiment, at least one of the sensors comprised by the sensor arrangement is a Hall effect sensor.

According to one embodiment, the tool further comprises a housing, and the trigger member is at least partly supported by the housing and movably arranged with respect to the housing. The power tool may in some embodiment further comprise a motor arranged in the housing and an output shaft connected to the motor, such that the rpm of the motor and/or the output shaft may be controlled by means of a movement of the trigger member relative to the housing, i.e. a depression of the trigger member. In some embodiments, the power tool may further comprise a spring element adapted to bias the trigger member to a first position, for example the starting or initial position such as the trigger member return to this initial position when released in a depressed stage. Further, according to one embodiment, the sensor arrangement is arranged in the housing. Such a sensor arrangement may be arranged on a circuit board in the housing.

According to one embodiment, the movable trigger element comprises a first guiding element adapted to, during assembly, slide along a guiding surface of the housing in a first plane, and a second guiding element adapted to, during assembly, bear against a second guiding surface of the housing in a second plane different from the first plane, such that the trigger element is guided into place. Hereby, a guidance is provided such that the member may be slid into position along a well-defined path during assembly and further makes it less likely that the trigger is accidentally forced into position during assembly, for example at a less favorable angle, possibly damaging the member itself and/or components arranged nearby such as electronic components of the tool. This is particularly advantageous in that a stronger magnetic field may be achieved at the positions of the sensor elements in that the trigger member, due to the precise path during assembly, may be arranged such that the magnetic element moves in very close vicinity of the magnetic sensor element. In other embodiments, the trigger member may comprise a supporting portion adapted to support for example a finger depressing the trigger member, the supporting portion extending along a direction of movement of the trigger member. Such a portion may be advantageous in that at least a part of the weight of the power tool may be supported by means of the supporting portion moving along with the trigger member instead of the finger sliding along the tool housing, hence mitigating known problems relating to the finger of the operator being pinched between the tool and the trigger. Hence, ergonomics of the trigger and tool is improved.

According to a second aspect of the present invention a method for calibrating a sensor arrangement for an actuator arrangement comprised by a power tool is provided, the sensor arrangement comprising at least an analog magnetic field sensor and a first digital magnetic field sensor, the method comprising the steps of displacing a magnetic element comprised by the trigger element along the sensor arrangement by means of a depression of the trigger member, retrieving (or monitoring) the response of the first analog magnetic sensor, retrieving (or monitoring) the response of the first digital magnetic sensor, determining a switching point of the first digital sensor and using the determined switching point as a fixed reference for a starting point for the analog magnetic sensor (to determine when the trigger stroke should start). In other words, the digital sensor may be used to provide a defined switching point by means of which the linear sensor may be calibrated, in that a starting point may be determined using the determined switching point of the digital sensor as a fixed reference.

In one embodiment, when performing such a method the assembled tool may firstly be set in a calibration state. This may be performed by means of a suitable switch, button or the like. The trigger is initially held at an initial stage, and as the trigger is depressed the output of the sensors is monitored using a suitable sampling frequency. More particularly, the value of the linear analog sensor is monitored specifically at the point when the digital sensor responds, i.e. at the switching point of the digital sensor. Hereby, the starting point of the trigger stroke is determined and any source of error relating to scatter in the response of the linear sensor is eliminated, and thus the behavior may be harmonized between different tools. Further, in some embodiments, a predetermined reference value or interval is set to which the output of the sensor or sensor may be compared. This is advantageous in that a value differing from this reference may be used as an indication of a problem such as faulty assembly or faulty components According to one embodiment of the second aspect of the invention, the sensor arrangement further comprises a second digital magnetic sensor and the method further comprises the steps of determining a switching point of the second digital sensor, and using the determined switching points as a fixed reference for a starting point for the analog magnetic sensor to determine when the trigger stroke should start. This may be advantageous in that redundancy and improved accuracy may be provided to the method. Further, as explained above, using two digital sensors is also advantageous for preventing accidental activation of the tool due to external fields.

According to one embodiment of the second aspect the method further comprises the step of determining a maximum point when the trigger stroke should end by means of a full depression of the trigger element. For example, according to one embodiment, the maximum point may be a position where a maximum rpm is reached. This position may in some embodiments be a position reached at a predetermined distance before maximum depression.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be better understood through the following illustrative and non-limiting detailed description of preferred embodiments, with reference to the appended drawing, on which.

All figures are schematic, not necessarily to scale and generally only show parts which are necessary in order to elucidate the invention, wherein other parts may be omitted or merely suggested.

DETAILED DESCRIPTION

Figure 1:
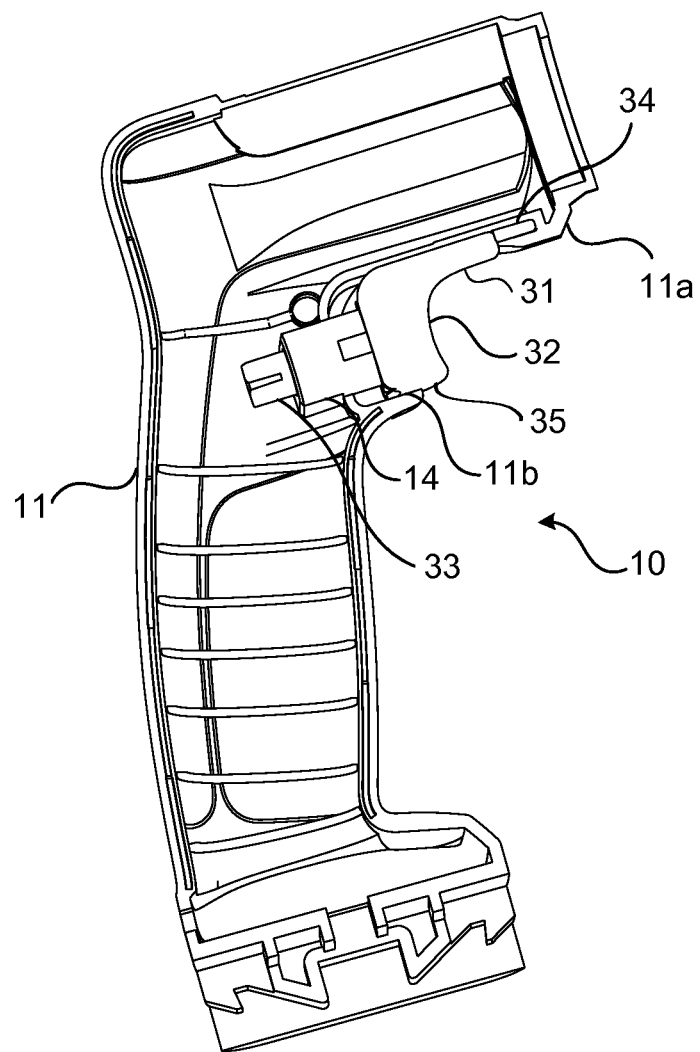
FIG. 1 is a perspective view of the trigger member arranged in a housing of a bolt tensioning tool according to one embodiment.

A power tool 10 comprising an actuator arrangement according to one embodiment is shown in a semi-cross sectional view in FIG. 1 wherein a movable trigger member 30 (see FIG. 2) is shown arranged in a housing 11 of the power tool. The trigger member is movable with respect to the housing in a first direction and comprises an upper elongated portion 31 extending in the first direction and a lower depression portion 32 extending substantially in a second direction perpendicular to the first direction and adapted to be pressed by an operator in order to control the tool 10. The upper elongated portion 31 is adapted to rest on a finger of the operator, such that the trigger member 30 may slide freely with respect to the housing 11 without risking any interference or injury with the finger but also to allow the user to bear some of the weight of the tool 10. Also shown in FIG. 1 is a protruding element 33 of the trigger member, a first guiding element 34 and a second guiding element 35. These features will be described in greater detail with reference to FIG. 2. The housing 11, shown in half in FIG. 1, is adapted to support the movable trigger member 30 and therefore comprises a guiding surface 11a and a second guiding surface 11b, adapted to among others facilitate mounting of the trigger member and an additional guiding structure 14 comprising a hole through which the protruding portion 33 of the trigger member 30 extends.

Figure 2:
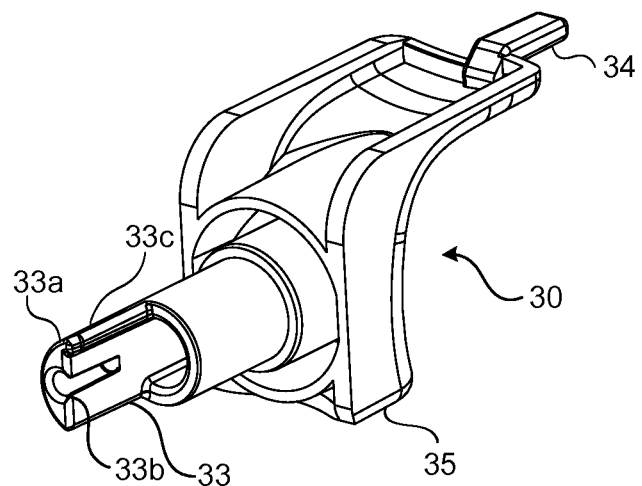
FIG. 2 is a perspective view of a trigger member of a bolt tensioning tool according to one embodiment of the invention.

Turning to FIG. 2, showing the trigger member 30 in a perspective view, the protruding element 33 may be viewed in greater detail. The protruding element at a first end 33a comprises a recess 33b in which a magnetic element (not shown), for example a permanent magnet, is arranged. This first end of the protruding element has a semicircular cross section. Hereby, the protruding element may move in close proximity to a circuit board or similar and component arrange thereon. Also among others to facilitate this interaction, the protruding element 33 comprises a supporting ridge 33c extending along the protruding element and adapted to slidingly bear against for example the circuit board mentioned above.

With regards to the guiding elements 34 and 35, the first guiding element 34 is arranged slightly offset from the center line of the trigger member 30 and adapted to slide along a surface 11a of the housing 11 during assembly thereby guiding the trigger member 30 into place to avoid any damage, particularly from protruding element to components on the circuit board. As the trigger member 30 approaches its assembled position however, the guiding tongue 34 snaps into a correct final position, ensuring a proper positioning of the trigger member 30 as well as locking the trigger member 30 into place. Providing a similar functionality, the second guiding element 35 is adapted to bear against a surface 11b of the housing 11 thereby during assembly, preventing a tilt of the trigger member 30.

Figure 3:
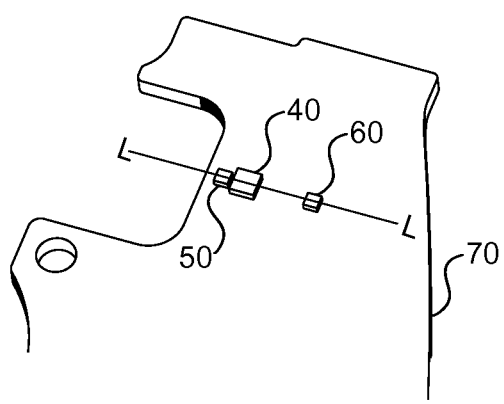
FIG. 3 is a schematic view of the sensor arrangement according to an exemplary embodiment.

Turning to FIG. 3, an exemplary embodiment of a sensor arrangement is shown. In the illustrated embodiment, an analog hall effect sensor 40 and a first and second digital hall effect sensor 50, 60 are linearly arranged along a line L-L on a surface of a circuit board 70. The analog sensor 40 is arranged between the first digital sensor 50 and the second digital sensor 60. As the trigger member 30 is depressed, the magnetic element arranged in the recess of the protruding element 33 will move along the linearly arranged sensors 50, 40, 60 and the magnetic field generated by the magnet will thus effect each of the sensors 50, 40, 60. The distance between the sensors, for example the distance between sensors 50 and 60, is as mentioned largely determined based on ergonomic considerations. In the embodiment illustrated in FIG. 3, the distance between the first digital sensor 50 and the analog sensor 40 is approximately 2 mm whereas the distance between the second digital sensor 60 and the analog sensor 40 is approximately 10 mm.

While the invention has been illustrated and described in detail in the drawings and foregoing description, such illustration and description are to be considered illustrative or exemplary and not restrictive; the invention is not limited to the disclosed embodiment. The skilled person understands that many modifications, variations and alterations are conceivable within the scope as defined in the appended claims. Additionally, variations to the disclosed embodiments can be understood and effected by those skilled in the art in practicing the claimed invention, form a study of the drawings, the disclosure and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A handheld power tool comprising an actuator arrangement, wherein:
    the actuator arrangement comprises a movable trigger member and a sensor arrangement;
    the trigger member comprises at least one magnetic element;
    the sensor arrangement is responsive to a displacement of the at least one magnetic element along with the movable trigger member relative to the sensor arrangement; and
    the sensor arrangement comprises:
        an analog magnetic field sensor configured to provide a signal proportional to a degree of depression of the trigger member;
        a first digital magnetic field sensor configured to provide a first signal in response to the at least one magnetic element reaching a first position defining a first switching point of the first digital magnetic field sensor; and
        a second digital magnetic field sensor configured to provide a second signal in response to the at least one magnetic element reaching a second position defining a second switching point of the second digital magnetic field sensor.

2. The handheld power tool according to claim 1, wherein the sensor arrangement is arranged such that the analog magnetic field sensor, the first digital magnetic field sensor, and the second digital magnetic field sensor are successively arranged at least in a first direction.

3. The handheld power tool according to claim 1, wherein the analog magnetic field sensor, the first digital magnetic field sensor, and the second digital magnetic field sensor of the sensor arrangement are linearly arranged.

4. The handheld power tool according to claim 1, wherein the analog magnetic field sensor is arranged between the first and second digital magnetic field sensors.

5. The handheld power tool according to claim 1, wherein the movable trigger member comprises a protruding element, and the at least one magnetic element is arranged in the protruding element.

6. The handheld power tool according to claim 5, wherein the protruding element comprises a recess, and the at least one magnetic element is fitted in the recess.

7. The handheld power tool according to claim 5, wherein:
    the sensor arrangement is arranged on a surface of a circuit board;
    the protruding element comprises a supporting ridge extending along the protruding element and adapted to slidingly bear against the surface of the circuit board; and
    the circuit board comprises a supporting portion along which the protruding element is adapted to slidingly bear.

8. The handheld power tool according to claim 1, wherein at least one of the analog magnetic field sensor, the first digital magnetic field sensor, and the second digital magnetic field sensor of the sensor arrangement is a Hall effect sensor.

9. The handheld power tool according to claim 1, further comprising a housing, wherein the trigger member is at least partly supported by the housing and movably arranged with respect to the housing.

10. The handheld power tool according to claim 9, wherein the movable trigger element comprises:
    a first guiding element configured to, during assembly, slide along a guiding surface of the housing in a first plane, and
    a second guiding element configured to, during assembly, bear against a second guiding surface of the housing in a second plane different from the first plane, such that the trigger element is guided into place.

11. The handheld power tool according to claim 1, wherein the tool is a handheld drill.

12. A method for calibrating a sensor arrangement for an actuator arrangement of a handheld power tool, the handheld power tool comprising a trigger member including a magnetic element, the sensor arrangement comprising an analog magnetic field sensor configured to provide a signal proportional to a degree of depression of the trigger member, a first digital magnetic field sensor configured to provide a first signal in response to the magnetic element reaching a first position defining a first switching point of the first digital magnetic field sensor, and a second digital magnetic field sensor configured to provide a second signal in response to the magnetic element reaching a second position defining a second switching point of the second digital magnetic field sensor, the method comprising:
    displacing the magnetic element of the trigger member along the sensor arrangement by depressing the trigger member;
    retrieving a response of the first analog magnetic sensor;
    retrieving a response of the first digital magnetic sensor;
    retrieving a response of the second digital magnetic sensor;
    determining a switching point of at least one of the first and second switching points; and
    using the determined switching point as a fixed reference for a starting point for the analog magnetic sensor to determine when a trigger stroke should start.

13. The method according to claim 12, further comprising:
    determining a maximum point when the trigger stroke should end by means of a full depression of the trigger element.

14. The method according to claim 12, wherein:
    in the handheld power tool the sensor arrangement is arranged such that the analog magnetic field sensor, the first digital magnetic field sensor, and the second digital magnetic field sensor are successively arranged at least in a first direction;
    the displacing comprises displacing the trigger member in the first direction along the sensor arrangement by depressing the trigger member; and
    the method further comprises setting the handheld power tool in an operative state in response to one of the first and second digital magnetic sensors indicating a decreasing field and the other of the first and second digital sensors indicating a rising field.

15. The method according to claim 12, wherein:
    in the handheld power tool the sensor arrangement is arranged such that the analog magnetic field sensor, the first digital magnetic field sensor, and the second digital magnetic field sensor are successively arranged at least in a first direction;
    the displacing comprises displacing the trigger member in the first direction along the sensor arrangement by depressing the trigger member; and the method further comprises setting the handheld power tool in an inoperative state in response to both of the first and second digital field sensors indicating a rising field.

\* \* \* \* \*